> United States Patent Office 2,835,682
Patented May 20, 1958

2,835,682

STEROL RECOVERY PROCESS

Charles S. Steiner, Homewood, Ill., and Earle Fritz, East Chicago, Ind., assignors to Swift & Company, Chicago, Ill., a corporation of Illinois No Drawing. Application August 8, 1955
Serial No. 527,166

16 Claims. (Cl. 260—397.25)

This invention in general relates to the isolation of sterols. More specifically, the invention relates to the recovery of sterols from sterol-containing materials by fractionation procedures.

Sterols are solid alcohols found in a wide variety of natural products or by-products from the processing of natural products. They are constituents of vegetable, marine and animal fats and comprise the greater portion, in most instances, of the unsaponifiable fraction. In recent years, there has been an increasing demand for sterols of high purity for pharmaceutical use. Hence, there has developed a need for a sterol recovery process adapted for industrial capacity.

The basic requirements for an industrial sterol recovery process is the production of a product of sufficiently high purity to conform to the specifications of the pharmaceutical industry and at the same time isolation of a substantial fraction of the total sterols in the raw material. In some instances, it is desirable to administer sterols orally, in which case the final product should be free of impurities which impart an undesirable taste to the product.

The process of this invention is designed for recovery of sterols from sterol-containing materials in general. Specific sources from which sterols may be isolated by the instant process are, to name a few, crude tall oil, tall oil pitch, sugar cane oil obtained from the dewaxing of sugar cane, hot well skimmings, cottonseed pitch, soybean pitch and corn oil pitch. The pitches such as tall oil pitch, cottonseed pitch, soybean pitch and corn oil pitch are generally preferred because the unsaponifiable fraction is more concentrated than in the raw material from which the pitch fraction is recovered. Tall oil is a by-product obtained from the sulfate and soda processes for production of paper from wood. It comprises rosin acids, fatty acids and a considerable portion of unsaponifiable material, all more or less complex in nature. Tall oil pitch is a dark viscous residue from the distillation of rosin acids and fatty acids of tall oil. It contains rosin acids, fatty acids, unsaponifiable material, oxidized products and polymerized products. Corn oil pitch, soybean pitch and cottonseed pitch are residues obtained in the distillation of the fatty acids of the respective vegetable oils. Sugar cane oil is a by-product of a process for recovery of the hard wax fraction of crude sugar cane wax. It is brown or dark green in color and contains 4–7% sterols. It is sometimes referred to as the soft wax fraction of sugar cane wax. The material is more fully described in Wax and Fatty Byproducts From Sugarcane, by Royal T. Balch, published by the Sugar Research Foundation, Inc., New York, New York, Technological Series No. 3, October 1947.

The process of this invention for recovery of sterols comprises fractionation of the sterol-containing composition in a liquid, normally gaseous hydrocarbon, e. g., propane, to obtain a sterol-enriched fraction, which will also contain some free fatty acids, fatty acid esters, rosin acids (tall oil and its pitch fraction), and unsaponifiable material. The sterol-enriched fraction, after separation from the solvent, is refluxed in alcoholic alkali solution to free the esterified sterols and to saponify the free acids. The mixture is then chilled to crystallize the sterols which are then separated from the soaps and other unsaponifiable material by centrifuging or filtration. An alcohol washing of the sterol cake followed by water washing is beneficial not only to remove the mother liquor but also to remove taste bodies which, to a large extent in this process, are soap and other water soluble and alcohol soluble compositions. The sterol crystals may then, if desired, be redissolved in alcohol and recrystallized to further purify said crystals. The final step in the process is the drying operation by conventional procedures.

The first step of fractionation in a liquid, normally gaseous hydrocarbon apparently removes materials from the sterol-containing compositions which would be difficult to remove in the subsequent crystallization steps. The omission of the propane fractionation may result in a product containing unknown ingredients which impart an undesirable taste to the final sterol product. These unknown ingredients can be removed by several additional recrystallizations, but this procedure results in low yields.

The temperature in the propane tower may vary from about 130° F. to 220° F. The volume ratio of propane to feed is preferably kept in the range of 10:1 to 30:1 at a pressure of approximately 550–750 p. s. i. As a rule, the sterol-enriched fraction comes off as the overhead fraction, but in the case of hot well skimmings, the sterol-enriched fraction was in the bottom fraction. Note Example III, supra.

The saponification, after fractionation in the liquid hydrocarbon, is best achieved in methanol because of the limited solubility of the sterols in methanol. However, other aliphatic alcohols such as ethanol and isopropanol may be used although the yield may be somewhat decreased. Yields may be increased somewhat when using these other alcohols by diluting the alcohol with water. The function of the caustic is to split any sterol esters of fatty acids and to saponify the fatty and rosin acids for separation from the sterols. Ratios by weight of the sterol-enriched fraction to alcohol vary between 1:1.5 to 1:10. Larger amounts of alcohol will increase the purity of the finished product but will tend to reduce yields. The amount of caustic should be at least sufficient to completely saponify the fatty materials. An excess of caustic is recommended. Refluxing the saponification mixture is a convenient way to provide agitation. Temperatures as low as 80° F. can be used if suitable agitation is provided. Temperatures above the atmospheric boiling point can be used if the saponification step is carried out under pressure. Higher temperatures in the range of 140° F. and above are advantageous in decreasing the time for saponification.

After the saponification is complete, the temperature of the mixture is lowered to about 90–120° F. to crystallize the free sterols. The soap and other unsaponifiables remain in solution and are thus easily separated from the sterols by filtration or centrifugation.

Addition of water to the saponified mixture prior to cooling provides further advantages in the sterol recovery process. Dilution of the alcoholic alkali to a content of 10–30% water by volume, preferably about 15%, provides maximum insolubility of the sterols without adversely affecting the solubility of the soaps and other unsaponifiable material in the solvent. Water dilution also appears to result in improved color in the sterol crystals. The crystallized sterols are then separated from the liquid phase by conventional filtration or centrifugal means. It is then advantageous to wash the crystals with an aliphatic alcohol. Increasing amounts of wash alcohol increase the purity of the sterols but reduce the yield. Temperatures of wash alcohol can be from about 80° F. to 246° F. depending upon the alcohol used.

Following the alcohol wash, the crystals are water washed at a temperature from 60° F. to 212° F. at a ratio of about 1:0.5 to 1:6 of sterol crystals to water on a weight basis or until substantially all of the water soluble components are removed.

The alcohol used in saponification may be of any of the low molecular weight alcohols which include methyl, ethyl, propyl, and butyl alcohols. Wash alcohol should preferably be the same alcohol as used in saponification but the process is not necessarily limited to the same alcohol for both steps. Methyl alcohol is the preferred alcohol for both saponification and washing because the sterols are less soluble in methyl alcohol than in other aliphatic alcohols.

If further purification of the sterols is desirable after performance of the foregoing steps, the sterols may be redissolved and recrystallized. The crystals are taken up in warm solvent such as isopropanol, ethanol and propanol and the solution is then cooled to crystallize the sterols which are then separated by centrifuging or filtering. The use of activated carbon may prove beneficial to remove residual color and taste bodies in this re-crystallization step. The final step in the process is the drying operation. We recommend the air drying of the sterol crystals in shallow pans in an oven at a temperature of about 180-220° F. Filtering apparatus should be employed to maintain the purity of the sterol crystals.

The following examples are supplied to illustrate specific applications of the process of this invention to recover substantially pure and bland sterols and should not be construed as placing any limitation on the invention defined in the appended claims.

*Example I*

Tall oil pitch was fed to the middle section of the propane tower, and propane was introduced to the lower section of the tower under a pressure of 680 p. s. i. g. The ratio of solvent to feed was 23:1, and the temperature in the tower was 160° F. at the bottom, 165° F. at the middle, 170° F. at the top of the tower. Analysis of samples taken during the operation of the propane unit were as follows:

|          | Percent | Color, FAC | Unsaponifiable Matter, percent | Sterols, percent |
|----------|---------|------------|-------------------------------|------------------|
| Feed     | 100     | DT 45      | 31.2                          | 15.5             |
| Overhead | 58      | 21         | 42.4                          | 22.4             |
| Bottoms  | 42      | DT 45      | 15.8                          | 6.0              |

After the propane was removed from the overhead fraction, 800 lbs. of commercially anhydrous alcohol was added to 200 lbs. of the overhead fraction which contained about 45 lbs. of sterols, and the mixture was heated to boiling. Sixty pounds of 50% sodium hydroxide solution was added. The mixture was refluxed at atmospheric pressure for about 3 hours whereupon it was then cooled to 100° F. and passed through a basket-type centrifuge. The centrifuge cake was then washed with 100 gallons of methyl alcohol at about 140° F., and with 35 gallons of water at about 180° F. The cake was removed and dried.

The dried sterols assayed 98% purity by digitonin assay and had essentially no taste or odor. The yield of sterol crystals was 31.5 lbs. The wash alcohol contained a total of 4.86 lbs. of sterols. This alcohol was used in the saponification step for the next batch, and 37.4 lbs. of sterols were recovered by employment of the process described for the first batch.

*Example II*

Propane and tall oil pitch were fed to a propane tower in the manner described in Example I, at a ratio of 30:1. The tower pressure was 680 p. s. i. g. and the temperature of the bottom, middle and top of the tower was 155° F., 160° F., 165° F. respectively. Samples taken during the operation of the propane unit were as follows:

|          | Percent | Color, FAC | Unsaponifiable Matter, percent | Sterols, percent |
|----------|---------|------------|-------------------------------|------------------|
| Feed     | 100     | DT 45      | 31.2                          | 15.5             |
| Overhead | 62.6    | 31         | 49.2                          | 21.0             |
| Bottoms  | 37.4    | DT 45      | 16.5                          | 7.1              |

To 200 lbs. of overhead fraction containing approximately 42 lbs. of sterols, 1400 lbs. of methyl alcohol was added followed by 60 lbs. of a 50% sodium hydroxide solution. The mixture was gently refluxed for 3 hours at which time 275 lbs. of water was added. Refluxing was continued for an additional 15 minutes, and then the mixture was cooled to 110° F. prior to centrifuging, after which the mixture was passed through a basket-type centrifuge. The centrifuge cake was then washed with 100 gallons of methyl alcohol at 140° F. and finally with 56 gallons of water at about 180° F. The cake was removed and dried. The yield of dried odorless sterols of bland taste was 36.5 lbs. and assayed at 98% sterols by digitonin assay. The wash alcohol in this example had a total of 4.2 lbs. of sterols. When the wash alcohol was used in the alcohol alkali saponification mixture in a subsequent similar sterol recovery, the yield of sterols was increased to 40.6 lbs. of dried sterols.

*Example III*

Hot well skimmings were fed to a propane tower at a ratio of 20 parts propane to 1 part skimmings. The tower was operated at a pressure of 690 p. s. i. g. and a temperature of 211° F., 214° F., and 217° F. for the bottom, middle and top of the propane tower respectively. Analysis of samples taken during the operation of the propane unit were as follows:

|          | Percent | Color, FAC | Unsaponifiable Matter, percent | Sterols, percent |
|----------|---------|------------|-------------------------------|------------------|
| Feed     | 100     | DT 45      | 32.2                          | 9.7              |
| Overhead | 50      | 9          | 24.0                          | 2.12             |
| Bottoms  | 50      | DT 45      | 37.1                          | 22.7             |

The bottoms fraction is saponified and the sterols purified and recovered by the procedure outlined in Example II.

*Example IV*

Crude tall oil was solvent extracted in a propane tower operating at 700 p. s. i. g. and temperatures of 196° F., 208° F., and 214° F. for the bottom, middle and top portions of the tower respectively. The ratio of feed of propane to crude tall oil was 30:1.

Analysis of the samples taken during the operation of the propane unit were as follows:

|          | Percent | Color, FAC | Unsaponifiable Matter, percent | Sterols, percent |
|----------|---------|------------|-------------------------------|------------------|
| Feed     | 100     | DT 45      | 6.4                           | 3.1              |
| Overhead | 48      | 11A        | 10.2                          | 5.0              |
| Bottoms  | 52      | DT 45      | 2.9                           | 0.6              |

The overhead fraction is saponified and the sterols purified and recovered by the procedure outlined in Example II.

Example V

Sugar cane oil was fed to a propane tower in the manner described in Example I at a ratio of 20 parts propane to 1 part sugar cane oil. The tower was operated at a pressure of 700 p. s. i. g. and a temperature of 190° F., 194° F., and 210° F. for the bottom, middle and top portions respectively. Analysis of the samples taken during the operation of the propane unit were as follows:

|  | Percent | Unsaponifiable Matter, percent | Sterols, percent |
|---|---|---|---|
| Feed | 100 | 23.3 | 6.5 |
| Overhead | 16 | 45.2 | 14.4 |
| Bottoms | 84 | 19.1 | 5.0 |

To 200 lbs. of the overhead fraction containing 28 lbs. of sterols, 750 lbs. of methyl alcohol and 50 lbs. of 50% sodium hydroxide solution were added. After refluxing for 3 hours, 180 lbs. of water was added and then the mixture was cooled to 115° F. The mixture was fed to a basket-type centrifuge wherein the sterol cake was washed with 75 gallons of methyl alcohol at 130° F. followed by 50 gallons of water at 200° F. The yield was 22.1 lbs. of sterols and of 98.2% assay. The wash alcohol contained 4.1 lbs. of sterols. The sterol yield in a second fractionation of sugar cane oil was increased by almost the latter amount by utilizing the wash alcohol as a portion of the alcoholic alkali saponification mixture.

The term "propane" in the description and appended claims is intended to mean a mixture of normally gaseous hydrocarbons comprising principally propane and lesser amounts of ethane and butane.

Obviously, many modifications and variations of the invention as hereinbefore set forth may be made without departing from the spirit and scope thereof, and therefore only such limitations should be imposed as are indicated in the appended claims.

We claim:

1. In a process for isolation of sterols, the steps which comprise: fractionation of a sterol-containing composition in a liquid, normally gaseous hydrocarbon to obtain a sterol-enriched fraction; saponification of said sterol-enriched fraction in an alcoholic alkali solution; and crystallization of the sterols by adding about 10–30% water and cooling the mixture.

2. In a process for isolation of sterols, the steps which comprise: fractionation of a sterol-containing composition in liquefied propane to obtain a sterol-enriched fraction; saponification of said sterol-enriched fraction in an alcoholic alkali solution; and crystallization of the sterols in the saponified mixture at a temperature between about 90° F. and 120° F., said mixture containing 10–30% water by volume.

3. In a process for isolation of sterols, the steps which comprise: fractionation of a sterol-containing composition in a liquid, normally gaseous hydrocarbon to obtain a sterol-enriched fraction; saponification of said sterol-enriched fraction in an alcoholic alkali solution; dilution of the saponified mixture to a content of 10–30% water by volume; and crystallization of the sterols by cooling the mixture.

4. In a process for isolation of sterols, the steps which comprise: fractionation of a sterol-containing composition in a liquid, normally gaseous hydrocarbon to obtain a sterol-enriched fraction; saponification of said sterol-enriched fraction in an alcoholic alkali solution; dilution of the saponfied mixture to a content of about 15% water by volume; and crystallization of the sterols by cooling the mixture.

5. In a process for isolation of sterols, the steps which comprise: fractionation of a sterol-containing composition in a liquid, normally gaseous hydrocarbon to obtain a sterol-enriched fraction; saponification of said sterol-enriched fraction in a methanol-alkali solution; dilution of the saponified mixture to a content of 10–30% water by volume; and crystallization of the sterols by cooling the mixture.

6. In a process for isolation of sterols, the steps which comprise: fractionation of a sterol-containing composition in liquefied propane at a temperature between about 130° F. and 220° F. and a pressure between 550–750 p. s. i. to obtain a sterol-enriched fraction; saponification of said sterol-enriched fraction in a methanol-alkali solution; dilution of the saponified mixture to a content of 10–30% water by volume; and crystallization of the sterols by cooling the mixture.

7. In a process for isolation of sterols, the steps which comprise: fractionation of a sterol-containing composition in liquefied propane at a temperature between about 130° F. and 220° F. and a pressure between 550–750 p. s. i. to obtain a sterol-enriched fraction, the volume ratio of propane to feed in the range of 10:1 to 30:1; saponification of said sterol-enriched fraction in a methanol-alkali solution, the ratio of sterol-enriched fraction to methanol falling between 1:1.5 and 1:10; dilution of the saponified mixture to a content of 10–30% water by volume; and cooling said solution to a temperature between about 90° F. and 120° F. to crystallize the sterols.

8. In a process for isolation of sterols, the steps which comprise: fractionation of a sterol-containing composition in liquefied propane at a temperature between about 130° F. and 220° F. and a pressure between 550–750 p. s. i. to obtain a sterol-enriched fraction, the volume ratio of propane to feed in the range of 10:1 to 30:1; saponification of said sterol-enriched fraction in a methanol-alkali solution, the ratio of sterol-enriched fraction to methanol falling between 1:1.5 and 1:10; and crystallization of the sterols in the saponified mixture at a temperature between about 90° F. and 120° F., said mixture containing 10–30% water by volume.

9. In a process for isolation of sterols, the steps which comprise: fractionation of a sterol-containing composition in liquefied propane at a temperature between about 130° F. and 220° F. and a pressure between 550–750 p. s. i. to obtain a sterol-enriched fraction, the volume ratio of propane to feed in the range of 10:1 to 30:1; refluxing said sterol-enriched fraction in an alcoholic alkali solution to saponify the fatty acids and free the esterified sterols; and crystallization of the sterols in the saponified mixture at a temperature between about 90° F. and 120° F., said mixture containing 10–30% water by volume.

10. In a process for isolation of sterols, the steps which comprise: fractionation of a sterol-containing composition in a liquid, normally gaseous hydrocarbon to obtain a sterol-enriched fraction; saponification of said sterol-enriched fraction in a methanol-alkali solution; and crystallization of the sterols in the saponified mixture at a temperature between about 90° F. and 120° F., said mixture containing 10–30% water by volume.

11. In a process for isolation of sterols, the steps which comprise: fractionation of a sterol-containing composition in liquefied propane at a temperature between about 130° F. and 220° F. and a pressure between 550–750 p. s. i. to obtain a sterol-enriched fraction; saponification of said sterol-enriched fraction in a methanol-alkali solution; dilution of the saponified mixture to a content of 10–30% water by volume; and crystallization of the sterols by cooling the mixture.

12. In a process for isolation of sterols, the steps which comprise: fractionation of a sterol-containing composition in liquefied propane at a temperature between about 130° F. and 220° F. and a pressure between 550–750 p. s. i. to obtain a sterol-enriched fraction; saponification of said sterol-enriched fraction in a methanol-alkali solution, the ratio of sterol-enriched fraction to methanol falling between 1:1.5 and 1:10; dilution of the saponified mixture to a content of 10–30% water by volume; and cooling said solution to a temperature between about 90° F. and 120° F. to crystallize the sterols.

13. In a process for isolation of sterols from tall oil pitch, the steps which comprise: fractionation of tall oil pitch in liquefied propane at a temperature between about 130° F. and 220° F. and a pressure between 550–750 p. s. i. to obtain a sterol-enriched fraction, the volume ratio of propane to feed in the range of 10:1 to 30:1; saponification of said sterol-enriched fraction in a methanol-alkali solution; dilution of the saponified mixture to a content of 10–30% water by volume; and crystallization of the sterols by cooling the mixture.

14. In a process for isolation of sterols from sugar cane oil, the steps which comprise: fractionation of sugar cane oil in liquefied propane at a temperature between about 130° F. and 220° F. and a pressure between 550–750 p. s. i. to obtain a sterol-enriched fraction, the volume ratio of propane to feed in the range of 10:1 to 30:1; saponification of said sterol-enriched fraction in a methanol-alkali solution; dilution of the saponified mixture to a content of 10–30% water by volume; and crystallization of the sterols by cooling the mixture.

15. In a process for isolation of sterols from hot well skimmings, the steps which comprise: fractionation of hot well skimmings in liquefied propane at a temperature between about 130° F. and 220° F. and a pressure between 550–750 p. s. i. to obtain a sterol-enriched fraction, the volume ratio of propane to feed in the range of 10:1 to 30:1, saponification of said sterol-enriched fraction in a methanol-alkali solution; dilution of the saponified mixture to a content of 10–30% water by volume; and crystallization of the sterols by cooling the mixture.

16. In a process for isolation of sterols from pitch fractions of vegetable triglyceride oils, the steps which comprise: fractionation of said pitch fraction in liquefied propane at a temperature between about 130° F. and 220° F. and a pressure between 550–750 p. s. i. to obtain a sterol-enriched fraction, the volume ratio of propane to feed in the range of 10:1 to 30:1; saponification of said sterol-enriched fraction in a methanol-alkali solution; dilution of the saponified mixture to a content of 10–30% water by volume; and crystallizing the sterols by cooling the mixture.

References Cited in the file of this patent
UNITED STATES PATENTS

| | | |
|---|---|---|
| 2,296,794 | Kruse | Sept. 22, 1942 |
| 2,528,482 | Young | Oct. 31, 1950 |

UNITED STATES PATENT OFFICE
CERTIFICATE OF CORRECTION

Patent No. 2,835,682                                May 20, 1958

Charles S. Steiner et al.

It is hereby certified that error appears in the printed specification of the above numbered patent requiring correction and that the said Letters Patent should read as corrected below.

Column 3, line 9, for "may be of any of" read -- may be any of --;

column 4, line 27, for "56 gallons of water" read -- 35 gallons of water --.

Signed and sealed this 8th day of July 1958.

(SEAL)
Attest:

KARL H. AXLINE                                                ROBERT C. WATSON
Attesting Officer                                            Commissioner of Patents